US009908561B2

(12) United States Patent
Nishimura et al.

(10) Patent No.: US 9,908,561 B2
(45) Date of Patent: Mar. 6, 2018

(54) REAR BODY STRUCTURE FOR AUTOMOBILES

(71) Applicant: MAZDA MOTOR CORPORATION, Hiroshima (JP)

(72) Inventors: Yoshikazu Nishimura, Hiroshima (JP); Takashi Narahara, Hiroshima (JP); Shuichi Nakagami, Higashi-Hiroshima (JP); Hiroaki Fujii, Hiroshima (JP); Gunji Yoshii, Kure (JP); Tomoe Matsuoka, Hiroshima (JP); Ai Nagira, Hiroshima (JP)

(73) Assignee: MAZDA MOTOR CORPORATION, Hirsoshima (JP)

( * ) Notice: Subject to any disclaimer, the term of this patent is extended or adjusted under 35 U.S.C. 154(b) by 211 days.

(21) Appl. No.: 15/023,077

(22) PCT Filed: May 12, 2015

(86) PCT No.: PCT/JP2015/002404
§ 371 (c)(1),
(2) Date: Mar. 18, 2016

(87) PCT Pub. No.: WO2015/190034
PCT Pub. Date: Dec. 17, 2015

(65) Prior Publication Data
US 2016/0221610 A1    Aug. 4, 2016

(30) Foreign Application Priority Data
Jun. 9, 2014   (JP) ................. 2014-118858

(51) Int. Cl.
*B62D 25/08*   (2006.01)
*B62D 25/04*   (2006.01)
*B62D 25/02*   (2006.01)

(52) U.S. Cl.
CPC ............. *B62D 25/04* (2013.01); *B62D 25/02* (2013.01); *B62D 25/087* (2013.01); *B62D 25/088* (2013.01)

(58) Field of Classification Search
CPC .... B62D 25/04; B62D 25/087; B62D 25/088; B62D 25/02
(Continued)

(56) References Cited

U.S. PATENT DOCUMENTS 5,102,186 A * 4/1992 Yoshii ................. B62D 25/088
                                                       296/203.04
6,196,622 B1 * 3/2001 Brodt .................. B62D 25/087
                                                       296/203.04

(Continued)

FOREIGN PATENT DOCUMENTS

JP   2009-298168 A   12/2009
JP   2010-018087 A   1/2010

(Continued)

OTHER PUBLICATIONS

International Search Report issued in corresponding PCT Application No. PCT/JP2015/002404 dated Jun. 9, 2015.

(Continued)

*Primary Examiner* — Jason S Morrow
*Assistant Examiner* — E Turner Hicks
(74) *Attorney, Agent, or Firm* — Studebaker & Brackett PC

(57) ABSTRACT

Each rear pillar (4) includes a rear pillar inner panel (33) and a rear pillar reinforcement (34). The rear pillar inner panel (33) and the rear pillar reinforcement (34) each include a substantially L-shaped corner portion (C1, C2) raised toward the rear pillar inner panel (33), and a ridge portion (X1, X2). The corner portions (C1, C2) are arranged next to each other in the direction toward a reinforcement (50), and (Continued)

an L-shaped closed cross section (40) is formed between the corner portions (C1, C2). The reinforcement (50) is, not via the closed cross section, directly connected to the corner portions (C1, C2). An upper portion of the L-shaped closed cross section (40) is connected to a closed rear header cross section (19).

10 Claims, 12 Drawing Sheets

(58) Field of Classification Search
USPC .............. 296/187.13, 203.04, 193.08, 29, 30
See application file for complete search history.

(56) References Cited

U.S. PATENT DOCUMENTS

| 6,874,844 | B2* | 4/2005 | Vincenti | B62D 25/087 |
| | | | | 296/193.08 |
| 7,083,225 | B2* | 8/2006 | Yakata | B62D 25/088 |
| | | | | 296/187.11 |
| 8,991,906 | B2* | 3/2015 | Shimizu | B62D 25/087 |
| | | | | 296/193.08 |
| 9,162,710 | B1* | 10/2015 | Yamamoto | B62D 25/16 |
| 2007/0138837 | A1* | 6/2007 | Tomioka | B62D 25/02 |
| | | | | 296/203.04 |
| 2011/0156447 | A1* | 6/2011 | Matsuoka | B62D 25/087 |
| | | | | 296/203.04 |
| 2014/0021748 | A1* | 1/2014 | Park | B62D 25/08 |
| | | | | 296/203.04 |
| 2015/0251703 | A1 | 9/2015 | Yamada et al. | |

FOREIGN PATENT DOCUMENTS

| JP | 2010-247612 A | 11/2010 |
| JP | 4900147 B | 1/2012 |
| JP | 5099113 B | 10/2012 |
| JP | 2014-046837 A | 3/2014 |

OTHER PUBLICATIONS

Written Opinion issued in corresponding PCT Application No. PCT/JP2015/002404 dated Jun. 9, 2015.

* cited by examiner

REAR BODY STRUCTURE FOR AUTOMOBILES

TECHNICAL FIELD

The technique disclosed in the present specification relates to a rear body structure for an automobile, the rear body structure including, at a rear body, right and left damper supports, a frame member forming a closed cross-sectional shape, and connection members each connected in the direction intersecting the frame member to transmit a load from a corresponding one of the damper supports to the frame member.

BACKGROUND ART

Typically in an automobile, such as a hatchback car, configured such that a trunk opening surrounded by right and left rear pillars (a frame body), a rear header, and a rear end panel is formed at a rear body, a beam member linearly supporting right and left damper supports in a vehicle width direction cannot be provided because a trunk space formed between the right and left damper supports needs to be ensured. For this reason, there is a disadvantage that a trunk and the trunk opening are easily deformed due to an input load received from suspension dampers each supporting a corresponding one of rear wheels.

In order to overcome such a disadvantage, the configuration disclosed in Patent Document 1 has been employed.

That is, in such a configuration, each rear pillar is formed to have a substantially triangular or rectangular closed cross section extending in the vertical direction, and a reinforcement (a connection member) connecting each rear pillar to a corresponding one of damper supports is provided to extend from the corresponding one of the damper supports toward the upper rear side of a vehicle so that an upwardly-input damper load (a pushing-up load) can be effectively transmitted to the closed rear pillar cross section.

The reinforcement extends toward the upper rear side of the vehicle, and the rear pillar is typically in a front-high rear-low inclination state. For this reason, the reinforcement is connected in the direction intersecting the closed rear pillar cross section, and pushes the front side of the closed rear pillar cross section. This easily deforms the closed rear pillar cross section, leading to a lower stiffness.

For this reason, a reinforcement member (a so-called "backing plate") receiving the reinforcement is, as disclosed in Patent Document 2, provided in the closed rear pillar cross section connected to the reinforcement, i.e., provided between a rear pillar inner panel (an inner panel of a frame member) and a rear pillar reinforcement (an outer-vehicle panel of the frame member), to reduce or prevent deformation of the closed rear pillar cross section.

CITATION LIST

Patent Document

PATENT DOCUMENT 1: Japanese Patent No. 4900147
PATENT DOCUMENT 2: Japanese Patent No. 5099113

SUMMARY OF THE INVENTION

Technical Problem

In the above-described case, stress is concentrated on the vicinity of the reinforcement member of the rear pillar, and such a portion is easily and slightly deformed when a load is initially input. In order to reduce or prevent chain deformation, the size of the reinforcement member may be increased, or the thickness of the rear pillar inner panel may be increased to withstand a shear load. However, these configurations lead to disadvantages such as an increase in the number of materials or a weight increase.

The technique disclosed in the present specification has been made in view of the above-described points, and is intended to realize weight reduction and a higher stiffness against a load input from each damper without providing an additional reinforcement member(s) (a so-called "backing plate(s)") and increasing the thickness of an inner panel of a frame member.

Solution to the Problem

The technique disclosed in the present specification relates to a rear body structure for an automobile, the rear body structure including, at a rear body, right and left damper supports, a frame member forming a closed cross-sectional shape, and a connection member connected in the direction intersecting the frame member to transmit a load from each damper support to the frame member. The frame member includes an inner panel and an outer-vehicle panel connected to the inner panel from the outside of a vehicle. The inner panel and the outer-vehicle panel each include a substantially L-shaped corner portion raised toward the inner panel, and a ridge portion formed by the corner portion and extending along the frame member. The corner portion of the inner panel and the corner portion of the outer-vehicle panel are arranged in the direction toward the connection member to form a recessed closed cross section between the corner portions. The connection member is, not via the closed cross section, directly connected to the corner portion of the inner panel and the corner portion of the outer-vehicle panel. An upper portion of the recessed closed cross section is connected to a cross-sectional portion having a higher modulus of section than that of the recessed closed cross section.

According to such a configuration, the inner panel and the outer-vehicle panel of the frame member forming the recessed closed cross section receive an upward load from a damper. Such a load is transmitted and dispersed via each ridge portion of the L-shaped corner portions.

The above-described modulus of section is less favorable as compared to a rectangular closed cross section having the same front-rear width and right-left width as those of the L-shaped closed cross section. However, deformation of the closed cross section can be more reduced as compared to an open cross section, and a load can be dispersed to the frame member. Weight reduction and a higher stiffness can be realized without providing an additional reinforcement member(s) (a so-called "backing plate(s)") or increasing the thickness of the inner panel of the frame member.

Moreover, the recessed closed cross section is formed in the vicinity of the connection portion between the frame member and the connection member. In particular, the connection member is directly connected to the outer-vehicle panel of the frame member, and the upper portion of the recessed closed cross section is connected to the cross-sectional portion having a higher modules of section than that of the recessed closed cross section. Thus, a load can be favorably transmitted and dispersed to the frame member. In particular, slight deformation can be effectively reduced when a load is initially input from the damper.

The recessed closed cross section is preferably an L-shaped closed cross section.

According to such a configuration, manufacturing is more facilitated as compared to, e.g., a more-complicated U-shaped closed cross section.

At least one of the inner panel or the outer-vehicle panel is preferably formed with a bead extending along the ridge portion.

According to such a configuration, the bead additionally forms the ridge portion. Thus, load transmission can be further improved. Weight reduction and a higher stiffness can be further realized.

A protrusion is preferably formed at a portion of the bead corresponding to the connection member.

According to such a configuration, the protrusion improves the stiffness of the bead, and therefore, bending deformation of the bead is reduced. A body stiffness can be improved.

A closed cross-sectional portion extending in the direction intersecting the frame member is preferably formed. At a portion where the recessed closed cross section is formed, the ridge portion of the outer-vehicle panel preferably protrudes toward the side connected to the connection member. The connection member is preferably connected to the ridge portion of the outer-vehicle panel. A closed corner cross section is preferably formed along the inner panel such that a corner ridge portion connecting between the ridge portion of the outer-vehicle panel and an outer surface of the closed cross-sectional portion is formed.

According to such a configuration, the closed corner cross section is formed along the inner panel of the frame member, and has the corner ridge portion connecting between the ridge portion of the outer-vehicle panel of the frame member and the outer surface of the closed cross-sectional portion extending in the direction intersecting the frame member. Thus, the following advantageous effects are provided.

That is, a damper load is directly transmitted from the connection portion between the ridge portion of the outer-vehicle panel of the frame member and the connection member to the outer surface of the closed cross-sectional portion extending in the direction intersecting the frame member via the corner ridge portion. Thus, the load can be dispersed. As a result, deformation of the closed cross section at the connection portion between the frame member and the connection member is reduced or prevented. Consequently, the stiffness can be improved.

Moreover, damper load transmission from the ridge portion of the outer-vehicle panel of the frame member to the outer surface of the closed cross-sectional portion extending in the direction intersecting the frame member via the corner ridge portion is further improved, leading to further stiffness improvement.

A trunk is preferably provided between the right and left damper supports. The frame member preferably includes right and left rear pillars. A trunk opening surrounded by the right and left rear pillars, a rear header, and a rear end panel is preferably formed at the rear body. The connection member is preferably a reinforcement extending from each damper support toward the rear side of the vehicle. The inner panel is preferably a rear pillar inner panel. The outer-vehicle panel is preferably a rear pillar reinforcement. The ridge portion of the rear pillar reinforcement preferably protrudes inward of the vehicle, and preferably extends in the vertical direction. The closed cross-sectional portion is preferably a closed rear header cross section formed by the rear header and a roof panel rear portion on the upper side of the trunk opening and extending in the vehicle width direction. The corner ridge portion preferably connects between the ridge portion of the rear pillar reinforcement and an upper surface of the closed rear header cross section. The closed corner cross section is preferably formed along the rear pillar inner panel such that the corner ridge portion is formed.

According to such a configuration, the closed corner cross section is formed along the rear pillar inner panel, and has the corner ridge portion connecting between the ridge portion of the rear pillar reinforcement and the upper surface of the closed rear header cross section. Thus, the following advantageous effects are provided.

That is, a damper load is directly transmitted from the connection portion between the ridge portion of the rear pillar reinforcement and the reinforcement to the upper surface of the closed rear header cross section via the corner ridge portion. Thus, the load can be dispersed. As a result, deformation of the closed cross section at the connection portion between the rear pillar and the reinforcement and corner deformation of the trunk opening, i.e., deformation of the trunk opening to a parallelogram shape, are reduced or prevented. Consequently, the stiffness can be improved.

Moreover, damper load transmission from the ridge portion of the rear pillar reinforcement to the upper surface of the closed rear header cross section via the corner ridge portion is further improved, leading to further stiffness improvement.

A corner reinforcement joined to the rear pillar inner panel and forming the closed corner cross section between the corner reinforcement and the rear pillar inner panel is preferably provided. An upper end portion of the corner reinforcement is preferably inserted into a rear portion of a closed cross section, the closed cross section being formed by the rear header and a hinge reinforcement formed to have a greater thickness than that of the roof panel and supporting a lift gate. The upper end portion of the corner reinforcement is preferably formed in an upwardly-raised U-shape such that a lower surface of the hinge reinforcement and the corner ridge portion are connected together and that a closed cross section is formed between the rear header and the corner reinforcement.

According to such a configuration, the lower surface of the thick hinge reinforcement and the corner ridge portion are connected together. Moreover, the upwardly-raised U-shape of the corner reinforcement forms the closed cross section between the rear header and the corner reinforcement. Thus, it can be further ensured that deformation of an upper corner of the trunk opening is reduced or prevented. Consequently, the stiffness can be further improved.

A trunk is preferably provided between the right and left damper supports. The frame member preferably includes right and left rear pillars. A trunk opening surrounded by the right and left rear pillars, a rear header, and a rear end panel is preferably formed at the rear body. The connection member is preferably a reinforcement extending from each damper support toward the rear side of the vehicle. The inner panel is preferably a rear pillar inner panel. The outer-vehicle panel is preferably a rear pillar reinforcement. Each corner portion is preferably raised toward the inner front side in the vehicle width direction, and preferably has a front surface and a side surface on the inside in the vehicle width direction. Each ridge portion preferably extends in the substantially vertical direction along a corresponding one of the rear pillars. The corner portion of the rear pillar inner panel is preferably disposed on the inner front side in the vehicle width direction with respect to the corner portion of the rear pillar reinforcement such that the recessed closed cross section is formed between the corner portions.

According to such a configuration, two components (the rear pillar inner panel and the rear pillar reinforcement) including the side surfaces exhibiting a high stiffness in the front-rear direction and positioned inside in the vehicle width direction and the front surfaces exhibiting a high stiffness in the vehicle width direction form the recessed closed cross section, and receive an upward load from the damper. Such a load is upwardly transmitted and dispersed via the ridge portions of the L-shaped corner portions.

The above-described modulus of section is less favorable as compared to a rectangular closed cross section having the same front-rear width and right-left width as those of the L-shaped closed cross section. However, deformation of the closed cross section can be more reduced as compared to an open cross section, and a load can be dispersed to above the rear pillar. Weight reduction and a higher stiffness can be realized without providing an additional reinforcement member(s) (a so-called "backing plate(s)") or increasing the thickness of the rear pillar inner panel.

Moreover, the recessed closed cross section is formed in the vicinity of the connection portion between the rear pillar and the reinforcement. In particular, the reinforcement is directly connected to the rear pillar reinforcement, and the upper portion of the recessed closed cross section is connected to the cross-sectional portion having a higher modules of section than that of the recessed closed cross section. Thus, a load can be favorably transmitted and dispersed to above the rear pillar. In particular, slight deformation can be effectively reduced when a load is initially input from the damper.

Advantages of the Invention

According to the technique disclosed in the present specification, weight reduction and a higher stiffness against a load input from the damper can be realized without providing an additional reinforcement member(s) (a so-called "backing plate(s)") and increasing the thickness of the inner panel of the frame member.

DESCRIPTION OF EMBODIMENTS

An example embodiment will be described below with reference to drawings. Note that in the figures, an arrow F indicates the forward direction of a vehicle, an arrow R indicates the backward direction of the vehicle, an arrow IN indicates the inward direction in the vehicle width direction, an arrow OUT indicates the outward direction in the vehicle width direction, and an arrow UP indicates the upward direction of the vehicle.

Figure 1:
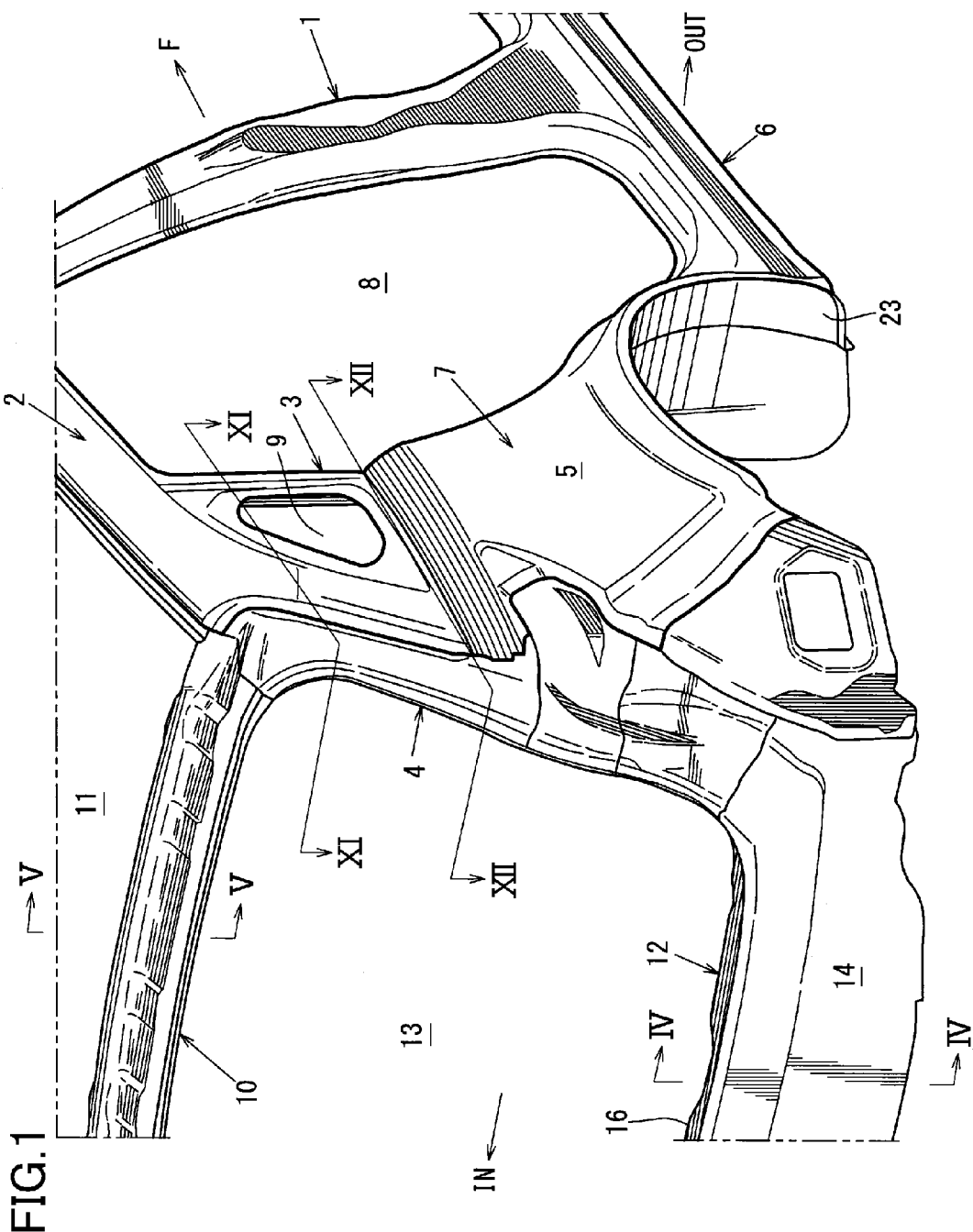
FIG. 1 is a perspective view of a rear body structure for an automobile according to an example embodiment.
Figure 2:
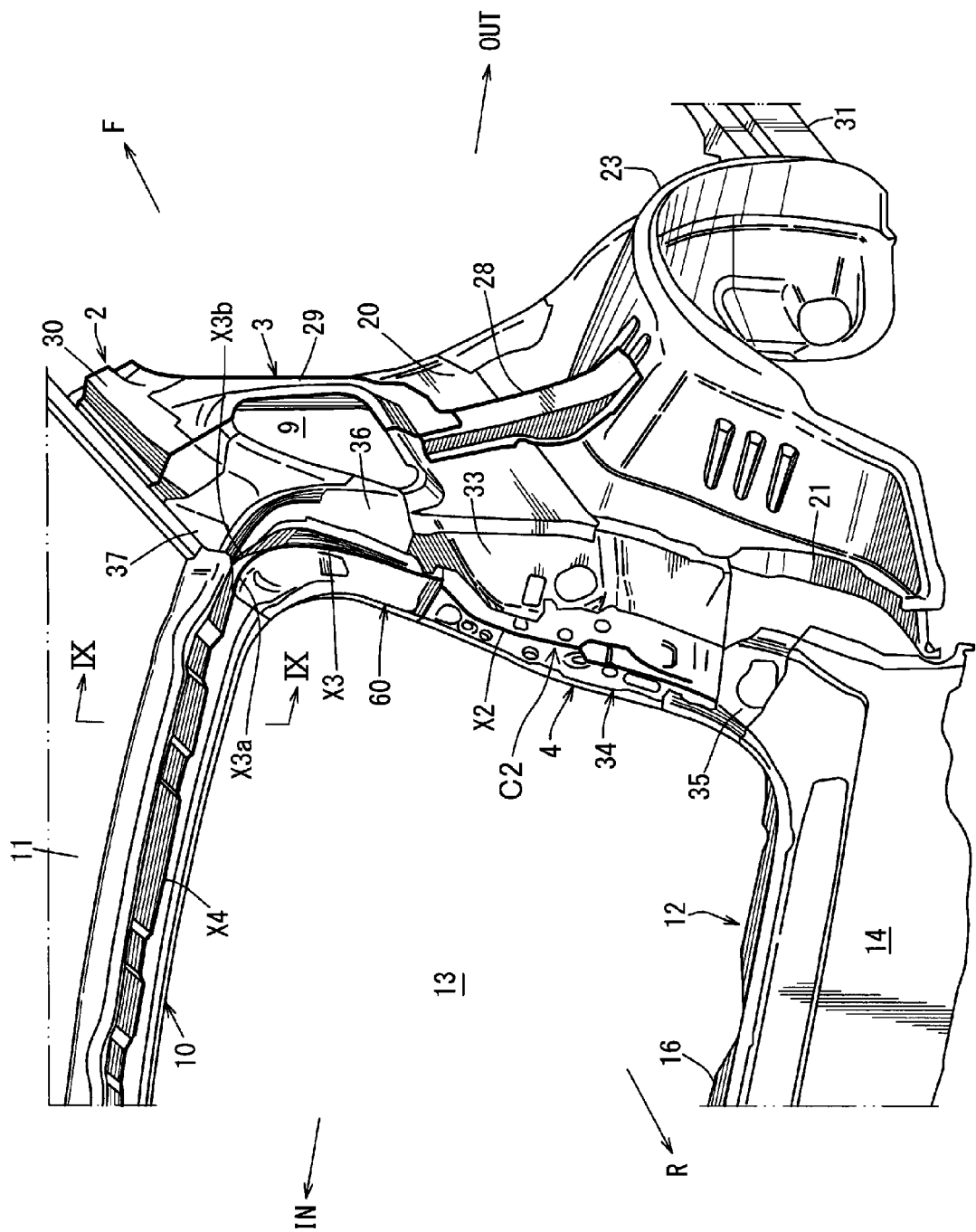
FIG. 2 is a perspective view of the rear body structure for the automobile in the state in which a side outer panel is detached.
Figure 3:
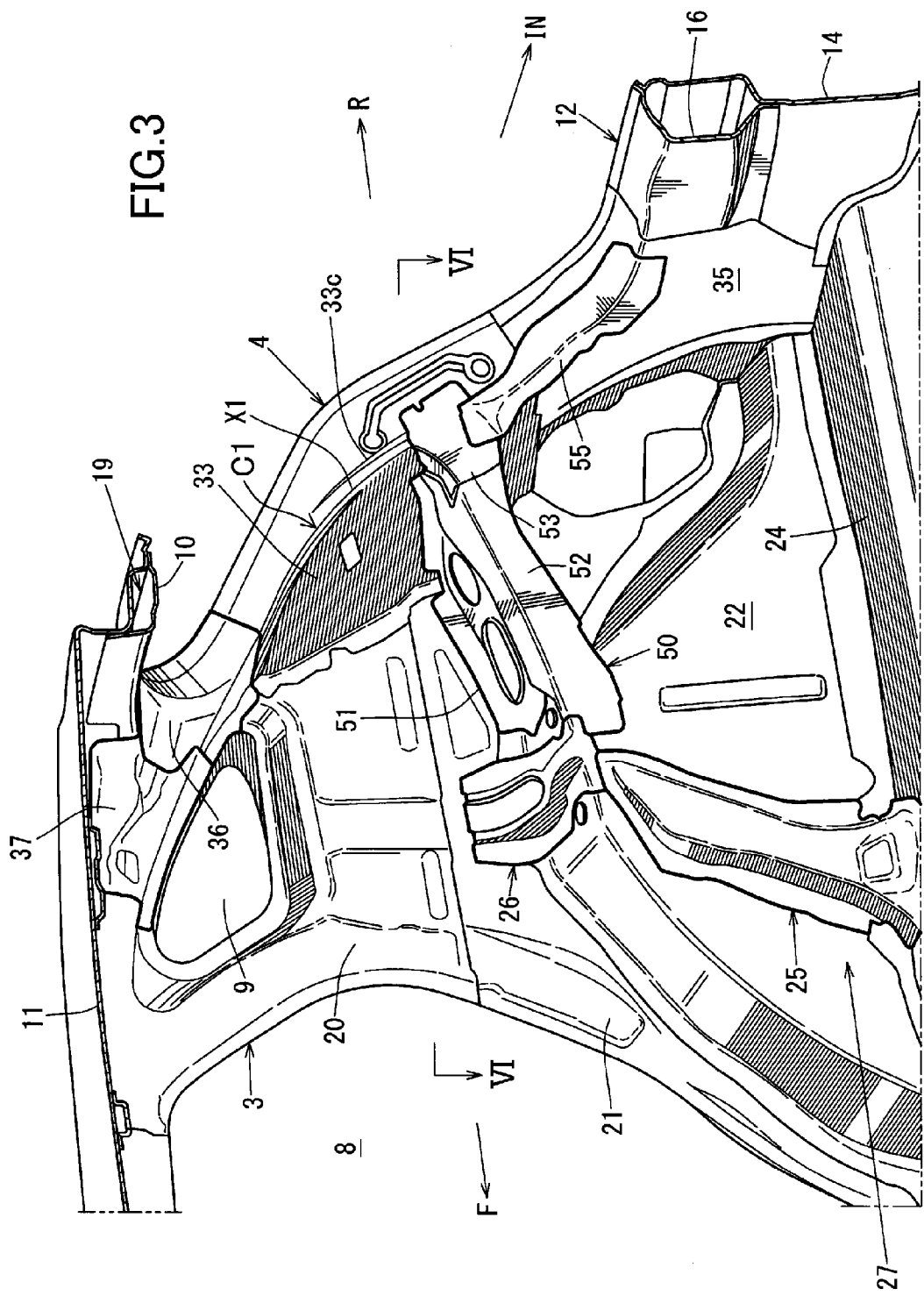
FIG. 3 is a perspective view of the rear body structure from the inside of a trunk.

FIG. 1 is a perspective view of a rear body structure of an automobile from the rear side of the vehicle, FIG. 2 is an enlarged perspective view of a main portion in the state in which a side outer panel is detached from the state of FIG. 1, and FIG. 3 is a perspective view of the rear body structure from the inside of a trunk.

As illustrated in FIG. 1, a side outer panel 7 is provided as an outer-vehicle panel covering, in a unified manner, a center pillar 1, a roof side rail 2, an intermediate pillar 3, a rear pillar 4 (a frame member), a rear fender 5, and a side sill 6.

A back-seat door opening 8 (a so-called "boarding door opening") surrounded by the center pillar 1, the roof side rail 2, the intermediate pillar 3, the rear fender 5, and the side sill 6 is formed, and a quarter window opening 9 surrounded by the intermediate pillar 3, a rear portion of the roof side rail 2, an upper portion of the rear pillar 4, and an upper portion of the rear fender 5 is formed.

A roof panel 11 is provided inside right and left roof side rails 2 (only the roof side rail on the right side of the vehicle is illustrated in the figure), a not-shown front header on the front side of the vehicle, and a rear header 10 on the rear side of the vehicle.

The rear header 10 is a member extending in the vehicle width direction on the upper rear side of the vehicle. On the other hand, a rear end panel 12 extending in the vehicle width direction is provided on the lower rear side of the vehicle.

A trunk opening 13 surrounded by right and left rear pillars 4 (only the rear pillar on the right side of the vehicle is illustrated in the figure), the rear header 10, and the rear end panel 12 is formed on the rear side of the vehicle. The trunk opening 13 is closed by a not-shown lift gate.

Figure 4:
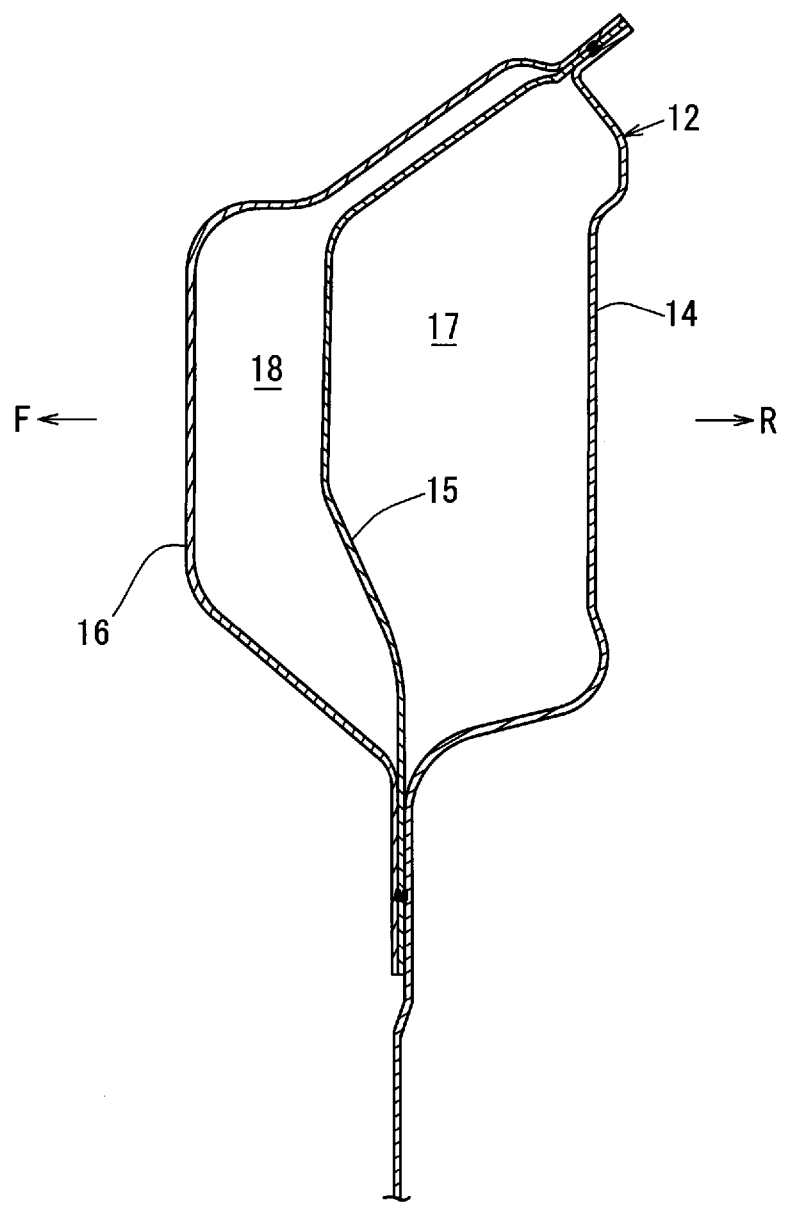
FIG. 4 is a cross-sectional view along an IV-IV line of FIG. 1.

FIG. 4 is a cross-sectional view along an IV-IV line of FIG. 1. As illustrated in FIG. 4, the rear end panel 12 includes a rear end outer panel 14, a rear end reinforcement 15, and a rear end inner panel 16. These components 14 to 16 are joined and fixed together at an upper portion of the rear end panel 12, and form closed rear end cross sections 17, 18 extending in the vehicle width direction. This improves the stiffness of a lower body.

Figure 5:
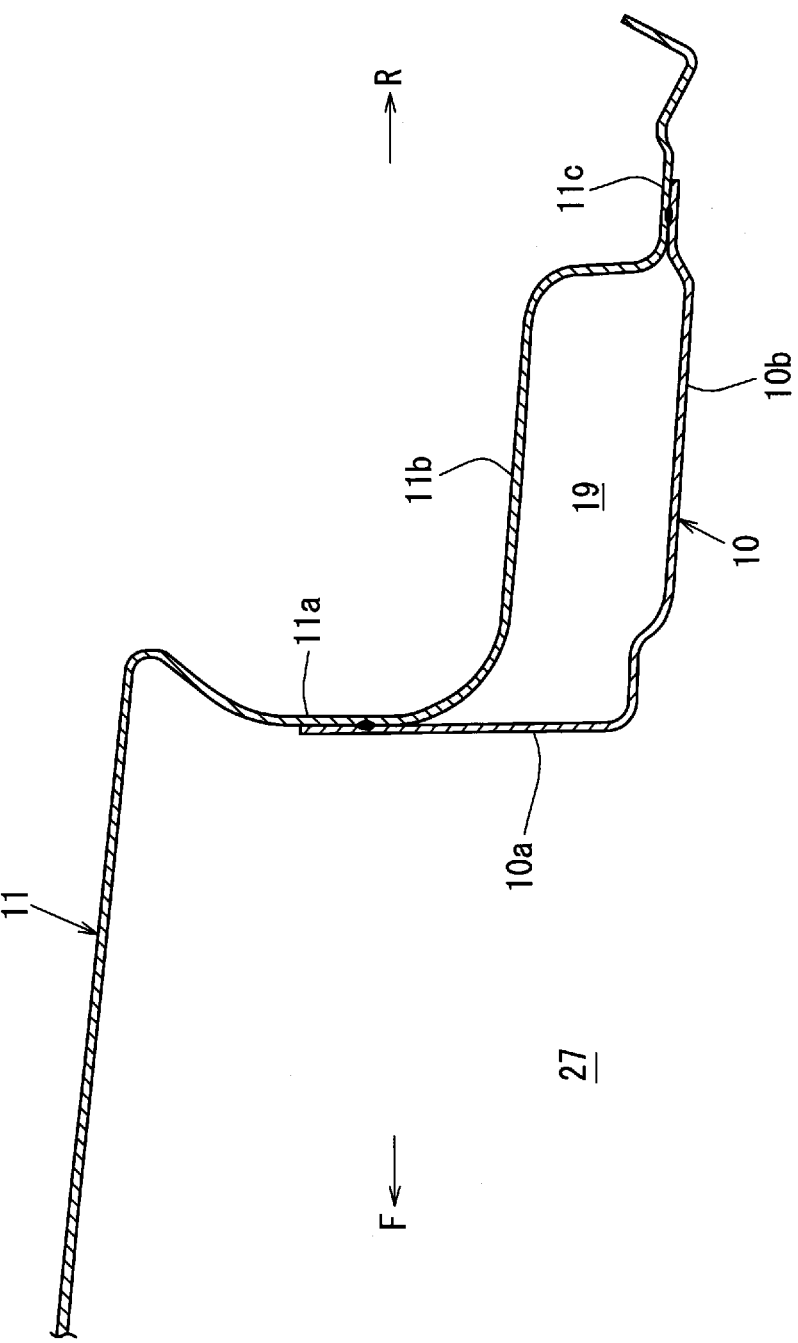
FIG. 5 is a cross-sectional view along a V-V line of FIG. 1.

FIG. 5 is a cross-sectional view along a V-V line of FIG. 1. As illustrated in FIG. 5, the roof panel 11 includes a vertical wall 11a formed to step down from a rear portion of the roof panel 11, an extension 11b horizontally extending backward from a lower end of the vertical wall 11a, and a recess 11c formed integrally with a rear end of the extension 11b.

The rear header 10 includes a vertical wall 10a extending in the vertical direction on the front side, and an extension 10b extending backward from a lower end of the vertical wall 10a. The rear header 10 is formed in a substantially L-shape as viewed from the side of the vehicle. A lower portion of the vertical wall 11a of the roof panel 11 and an upper portion of the vertical wall 10a of the rear header 10 are joined and fixed together, and a lower surface of the recess 11c of the roof panel 11 and an upper rear surface of the extension 10b of the rear header 10 are joined and fixed together. A closed rear header cross section 19 (a cross-sectional portion having a higher modulus of section than that of the recessed closed cross section, and a closed cross-sectional portion extending in the direction intersecting the frame member) extending in the vehicle width direction (the direction intersecting the rear pillar 4) is formed between the roof panel 11 and the rear header 10. This improves the stiffness of an upper body.

As illustrated in FIG. 3, a side inner upper 20 and a side inner lower 21 form a trunk side wall. A wheel house inner 22 is joined and fixed to the inside of the side inner lower 21 in the vehicle width direction, and a wheel house outer 23 is, as illustrated in FIG. 2, joined and fixed to the outside of the side inner lower 21 in the vehicle width direction. Both components 22, 23 form a wheel house.

As illustrated in FIG. 3, a lower end portion of the wheel house inner 22 is connected and fixed to a rear floor 24 as a floor panel. A vertical reinforcement 25 having a substantially hat-shaped horizontal cross section is, between a vertical portion of the wheel house inner 22 on the inside in the vehicle width direction and the rear floor 24, joined and fixed corresponding to the arrangement position of a not-shown rear suspension damper (hereinafter simply referred to as a "damper"). With this configuration, inward tilting of the wheel house inner 22 is reduced or prevented.

A damper support bracket 26 (a damper support) obliquely connecting the side inner lower 21 and the wheel house inner 22 is provided corresponding to the support position of an upper end portion of the damper. The damper support bracket 26 is configured to transmit and disperse an input load from the damper to the side inner lower 21.

A trunk 27 is provided between the damper support brackets 26 (only the damper support bracket on the right side of the vehicle is illustrated in the figure).

As illustrated in FIG. 2, an damper support outer reinforcement 28 obliquely connecting the wheel house outer 23 and the side inner upper 20 and having a substantially hat-shaped horizontal cross section is provided at the vehicle-outer position corresponding to the damper support bracket 26. The damper support outer reinforcement 28 is configured to transmit and disperse an input load from the damper to the side inner upper 20.

An intermediate pillar reinforcement 29 forming the intermediate pillar 3 is provided at a front portion of the quarter window opening 9. A lower portion of the intermediate pillar reinforcement 29 is connected and fixed to the damper support outer reinforcement 28, and an upper portion of the intermediate pillar reinforcement 29 is connected and fixed to a roof side reinforcement 30 forming the roof side rail 2. Note that in FIG. 2, a reference numeral "31" denotes a side sill reinforcement forming the side sill 6.

Figure 6:
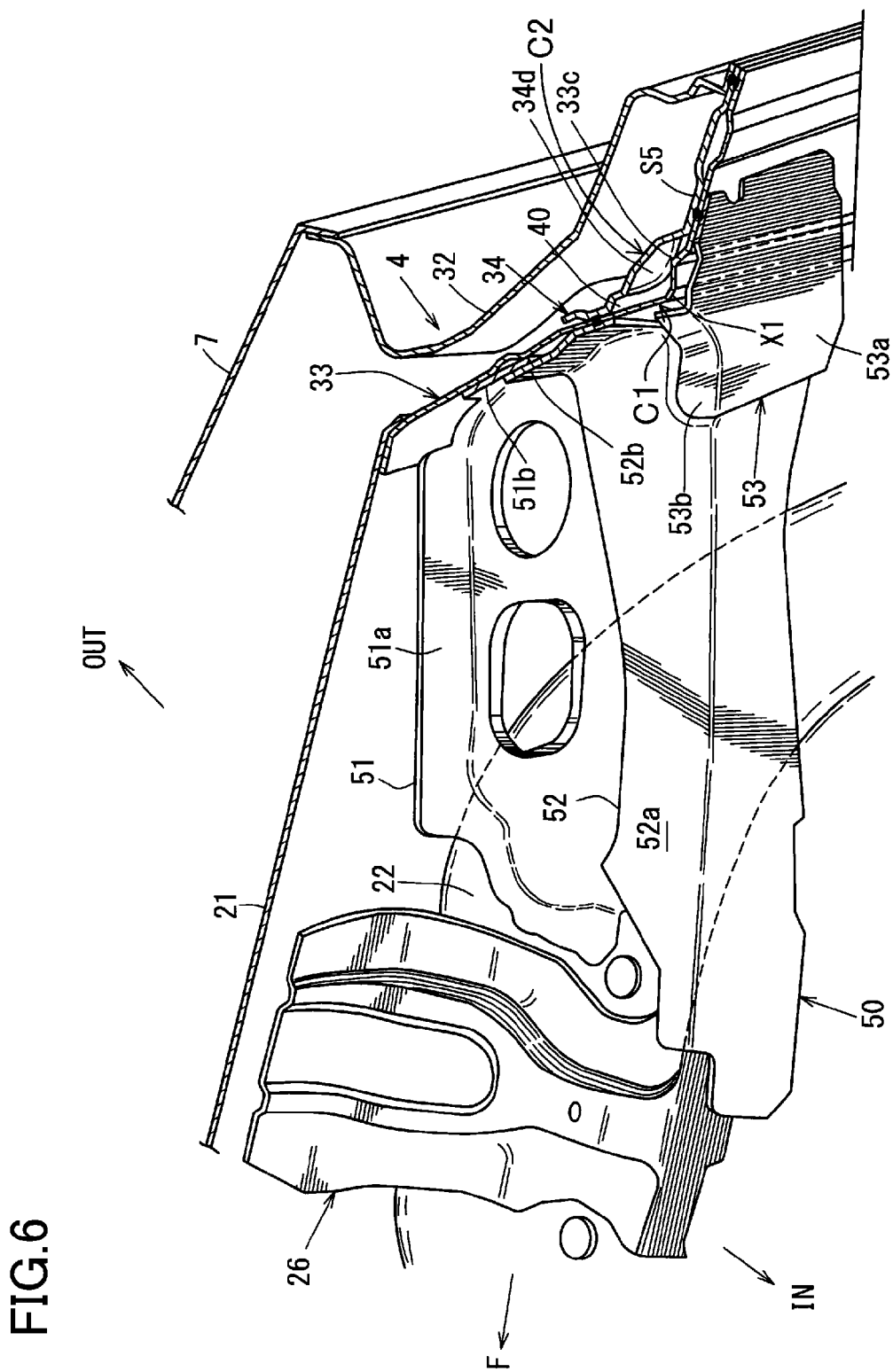
FIG. 6 is an enlarged perspective view of a main portion along a VI-VI line of FIG. 3.

FIG. 6 is an enlarged perspective view of a main portion along a VI-VI line of FIG. 3. As illustrated in FIGS. 3 and 6, the rear pillar 4 includes a rear pillar outer panel 32, a rear pillar inner panel 33 (an inner panel of the frame member), and a rear pillar reinforcement 34 disposed between the rear pillar outer panel 32 and the rear pillar inner panel 33 and connected to the rear pillar inner panel 33 from the outside of the vehicle.

As illustrated in FIG. 3, a lower portion of the rear pillar inner panel 33 and an end portion of the rear end panel 12 in the vehicle width direction are connected and fixed together via a lower corner inner panel 35. An upper portion of the rear pillar inner panel 33 and an end portion of the rear header 10 in the vehicle width direction are connected and fixed together via an upper corner inner panel 36.

Note that as illustrated in FIGS. 2 and 3, the rear portion of the roof side rail 2 and the upper corner inner panel 36 are connected and fixed together via a corner connection panel 37.

Figure 7:
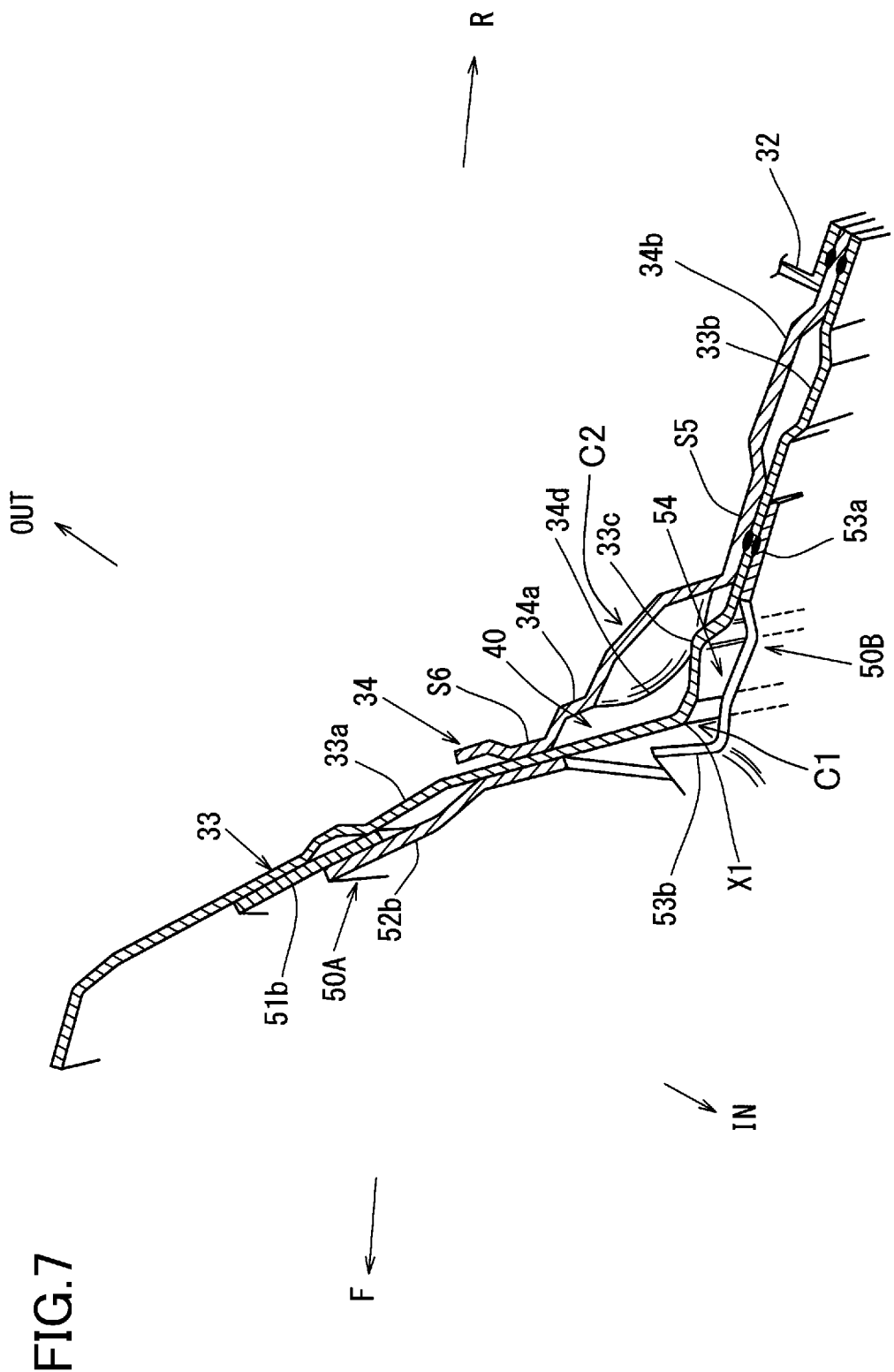
FIG. 7 is an enlarged view of a main portion of FIG. 6.
Figure 8:
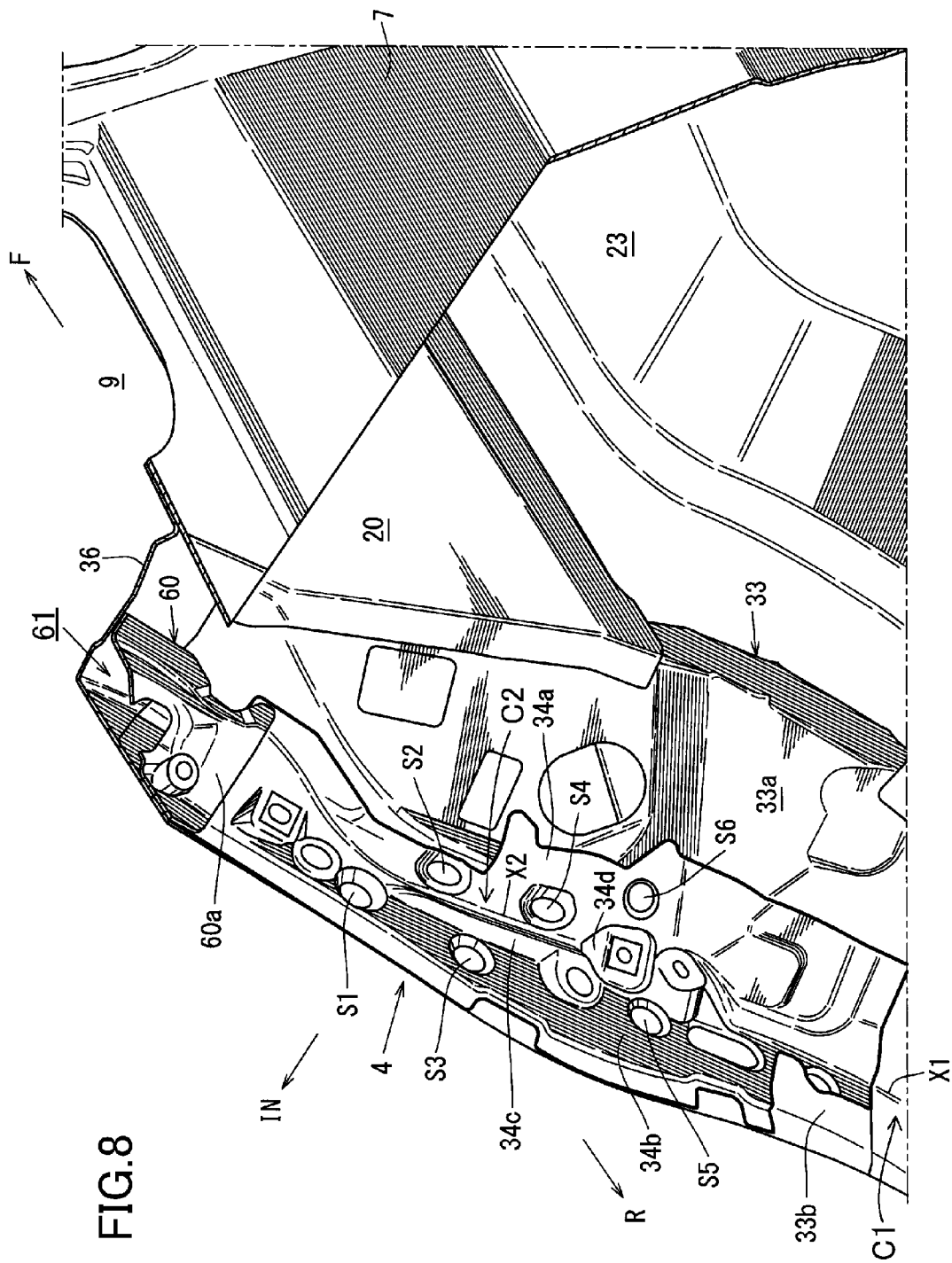
FIG. 8 is a perspective view of a main portion of a rear pillar portion from the rear side of a vehicle.

FIG. 7 is an enlarged view of a main portion of FIG. 6, and FIG. 8 is a perspective view of a main portion of a rear pillar portion from the rear side of the vehicle.

As illustrated in FIGS. 6 to 8, the rear pillar inner panel 33 and the rear pillar reinforcement 34 form a raised portion on the inner front side (the side close to the intermediate pillar 3) in the vehicle width direction. The rear pillar inner panel 33 includes a substantially L-shaped corner portion C1 with a front surface 33a (see FIG. 7) and a side surface 33b (see FIG. 7) on the inside in the vehicle width direction, and a ridge portion (an inner-vehicle ridge portion) X1 (see FIG. 3) formed by the corner portion C1 and extending substantially in the vertical direction along the rear pillar 4. The rear pillar reinforcement 34 includes a substantially L-shaped corner portion C2 with a front surface 34a (see FIG. 7) and a side surface 34b (see FIG. 7) on the inside in the vehicle width direction, and a ridge portion (an inner-vehicle ridge portion) X2 formed by the corner portion C2 and extending substantially in the vertical direction along the rear pillar 4.

The corner portion C1 of the rear pillar inner panel 33 is disposed on the inner front side in the vehicle width direction with respect to the corner portion C2 of the rear pillar reinforcement 34 (the corner portion C1 of the rear pillar inner panel 33 and the corner portion C2 of the rear pillar reinforcement 34 are arranged next to each other in the direction toward a reinforcement 50). Thus, an L-shaped closed cross section 40 as a substantially L-shaped recessed closed cross section is formed between the rear pillar inner panel 33 and the rear pillar reinforcement 34.

As illustrated in FIGS. 7 and 8, recesses S1 to S6 for inner panel joining are formed in a zigzag pattern at the rear pillar reinforcement 34 such that some of the recesses S1 to S6 are recessed inward in the vehicle width direction at the side surface 34b and that the remaining ones of the recesses S1 to S6 are recessed forward of the vehicle at the front surface 34a.

At the position of each of the recesses S1 to S6, the rear pillar reinforcement 34 and the rear pillar inner panel 33 are joined and fixed together by spot welding. That is, the rear pillar reinforcement 34 is directly and partially connected to the rear pillar inner panel 33 at the position of each of the recesses S1 to S6.

As illustrated in FIG. 7, a bead 33c vertically extending along the ridge portion X1 of the L-shaped corner portion C1 is formed at the rear pillar inner panel 33. As illustrated in FIG. 8, a bead 34c vertically extending along the ridge portion X2 of the L-shaped corner portion C2 is also formed at the rear pillar reinforcement 34.

With the beads 33c, 34c vertically extending along the ridge portions X1, X2, a ridge line is formed across both sides and top of each bead 33c, 34c as viewed in the cross section. This improves load transmission in the vertical direction.

As illustrated in FIG. 8, the recesses S1 to S6 are arranged in the zigzag pattern, and the rear pillar reinforcement 34 and the rear pillar inner panel 33 are welded and fixed together via the recesses S1 to S6. With this configuration, the shapes of the beads 33c, 34c are retained.

As illustrated in FIGS. 6 to 8, a protrusion 34d expanding in the front-rear direction is formed integrally with a lower portion of the bead 34c of the rear pillar reinforcement 34, the lower portion corresponding to the later-described reinforcement 50 (a connection member). The protrusion 34d improves the stiffness of the ridge portion X2 of the corner portion C2 and the bead 34c in the front-rear direction, and reduces bending deformation of the ridge portion X2 and the bead 34c in the front-rear direction. With this configuration, body stiffness is improved.

Note that in the case of forming no bead 34c, the protrusion 34d can reduce bending deformation of the ridge portion X2 in the front-rear direction, leading to improvement of the body stiffness.

As illustrated in FIG. 7, the protrusion 34d is, as a beam, provided to bridge between the recess S6 as a rear pillar front surface joint portion and the recess S5 as a rear pillar side surface joint portion such that theses recesses S5, S6 are connected together. With this configuration, the stiffness of the connection portion between the rear pillar 4 and the reinforcement 50 is ensured.

As illustrated in FIGS. 3 and 6, the reinforcement 50 (a so-called "longitudinal reinforcement") extending toward the upper rear side of the vehicle from a rear portion of the damper support bracket 26 is directly connected to the L-shaped corner portions C1, C2 of the rear pillar inner panel 33 and the rear pillar reinforcement 34, such connection being made not via the closed cross section, i.e., an outer peripheral portion of the L-shaped closed cross section 40. As illustrated in FIGS. 6 and 7, an upward load from the damper is received by the side surfaces 33b, 34b formed on the inside in the vehicle width direction and exhibiting a high stiffness in the front-rear direction and the front surfaces 33a, 34a exhibiting a high stiffness in the vehicle width direction. Such a load is upwardly transmitted and dispersed via each of the ridge portions X1, X2 of the L-shaped corner portions C1, C2.

As illustrated in FIG. 6, the reinforcement 50 is configured such that an outer member 51, an inner member 52, and a gazette member 53 are joined together. The outer member 51 includes a side portion 51a joined and fixed to the side inner lower 21, and a rear portion 51b joined and fixed to a front surface of the rear pillar inner panel 33.

The inner member 52 connects and fixes a front portion of a main body 52a to the rear portion of the damper support bracket 26, the main body 52a being formed in a substantially L-shape as viewed from the front side of the vehicle. The inner member 52 is configured such that an upper portion 52b is integrally formed with the main body 52a to extend upward from a rear end of the main body 52a. As illustrated in FIG. 7, three portions are welded and fixed together. That is, the upper portion 52b is welded and fixed to the front surface 33a of the rear pillar inner panel 33 and the recess S6 of the rear pillar reinforcement 34.

As illustrated in FIG. 6, the gazette member 53 includes a side portion 53a formed on the inside in the vehicle width direction and joined and fixed to a side surface of the main body 52a of the inner member 52 on the inside in the vehicle width direction and to the side surface 33b of the rear pillar inner panel 33, and an L-shaped upper portion 53b integrally formed with the outside of the side portion 53a in the vehicle width direction. As illustrated in FIG. 7, three portions are welded and fixed together. That is, the side portion 53a is welded and fixed to the side surface 33b of the rear pillar inner panel 33 and the recess S5 of the rear pillar reinforcement 34.

That is, in the reinforcement 50, the rear portion 51b of the outer member 51, the upper portion 52b of the inner member 52, and the upper portion 53b of the gazette member 53 form an upper surface 50A joined to a front surface of the rear pillar 4, and the side portion 53a of the gazette member 53 forms, on the inside in the vehicle width direction, a side surface 50B joined to a side surface of the rear pillar 4. The upper surface 50A and the side surface 50B form a substantially L-shaped cross section as viewed in the plane, and an L-shaped closed cross section 54 is formed between the substantially L-shaped cross section and the rear pillar inner panel 33. The L-shaped closed cross section 54 and the L-shaped closed cross section 40 form an L-shaped double closed cross-sectional structure.

As illustrated in FIG. 3, a lower portion of the side portion 53a of the gazette member 53 and the lower corner inner panel 35 connected to the end portion of the rear end panel 12 in the vehicle width direction are connected to a lower corner reinforcement 55 having an L-shaped cross section in the front-rear direction. With the joint portion between a rear portion of the reinforcement 50 and the rear pillar 4, four-portion joining causing more stress concentration is avoided. The lower corner reinforcement 55 improves the stiffness of a rear body.

An upper portion of the L-shaped closed cross section 40 (see FIGS. 6 and 7) is connected to the closed rear header cross section 19 (see FIG. 5) having a higher modulus of section than that of the L-shaped closed cross section 40. The closed rear header cross section 19 is positioned on the upper side of the trunk opening 13. As illustrated in FIG. 5, the rear header 10 and the rear portion of the roof panel 11 form the closed rear header cross section 19 such that the closed rear header cross section 19 extends in the vehicle width direction.

As illustrated in FIGS. 2, 3, and 8, each rear pillar 4 forms a corresponding one of the right and left sides (only the right side is illustrated in the figure) of the trunk opening 13. Each rear pillar 4 has the ridge portions X1, X2 protruding inward of the vehicle (toward the connection side with the reinforcement 50) and extending in the vertical direction. The reinforcement 50 is connected to the ridge portions X1, X2 of the rear pillar 4 (see FIGS. 3, 6, and 7).

As illustrated in FIG. 2, a corner reinforcement 60 is provided to form a corner ridge portion X3 connecting between the ridge portion X2 and an upper surface (an outer-vehicle surface) of the closed rear header cross section 19 (see FIG. 5), and is joined to the rear pillar inner panel 33 to form a later-described closed corner cross section 61 (see FIG. 10) between the corner reinforcement 60 and the rear pillar inner panel 33.

With the corner ridge portion X3, a damper load is directly transmitted from the connection portion between the ridge portion X2 of the rear pillar 4 and the reinforcement 50 to the upper surface of the closed rear header cross section 19 via the ridge portion X2 and the corner ridge portion X3. Thus, deformation of the L-shaped closed cross sections 40, 54 at the connection portion between the rear pillar 4 and the reinforcement 50 and deformation of the trunk opening 13 to a parallelogram shape are reduced or prevented. This improves the stiffness.

Figure 9:
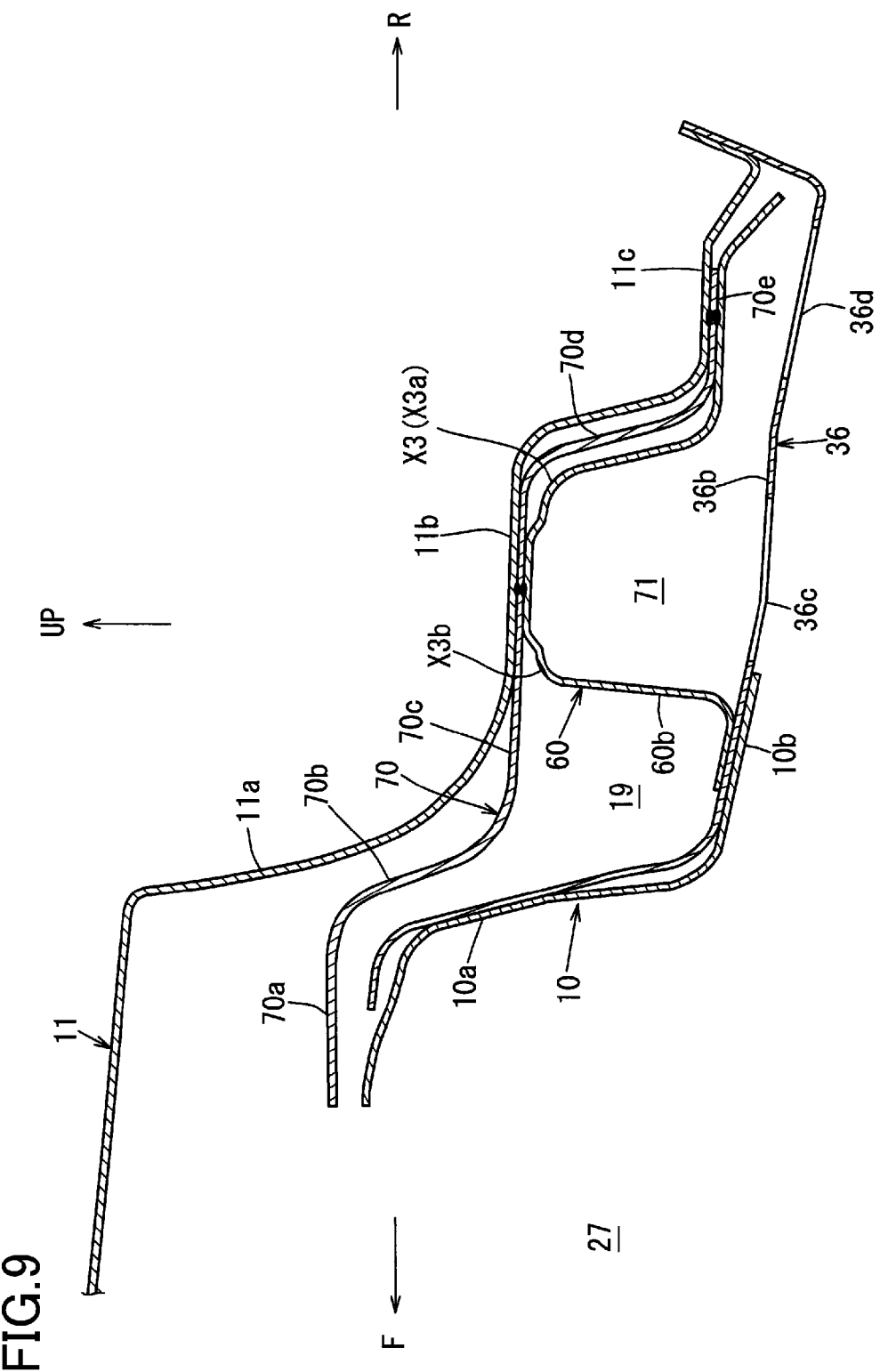
FIG. 9 is a cross-sectional view along an IX-IX line of FIG. 2.
Figure 10:
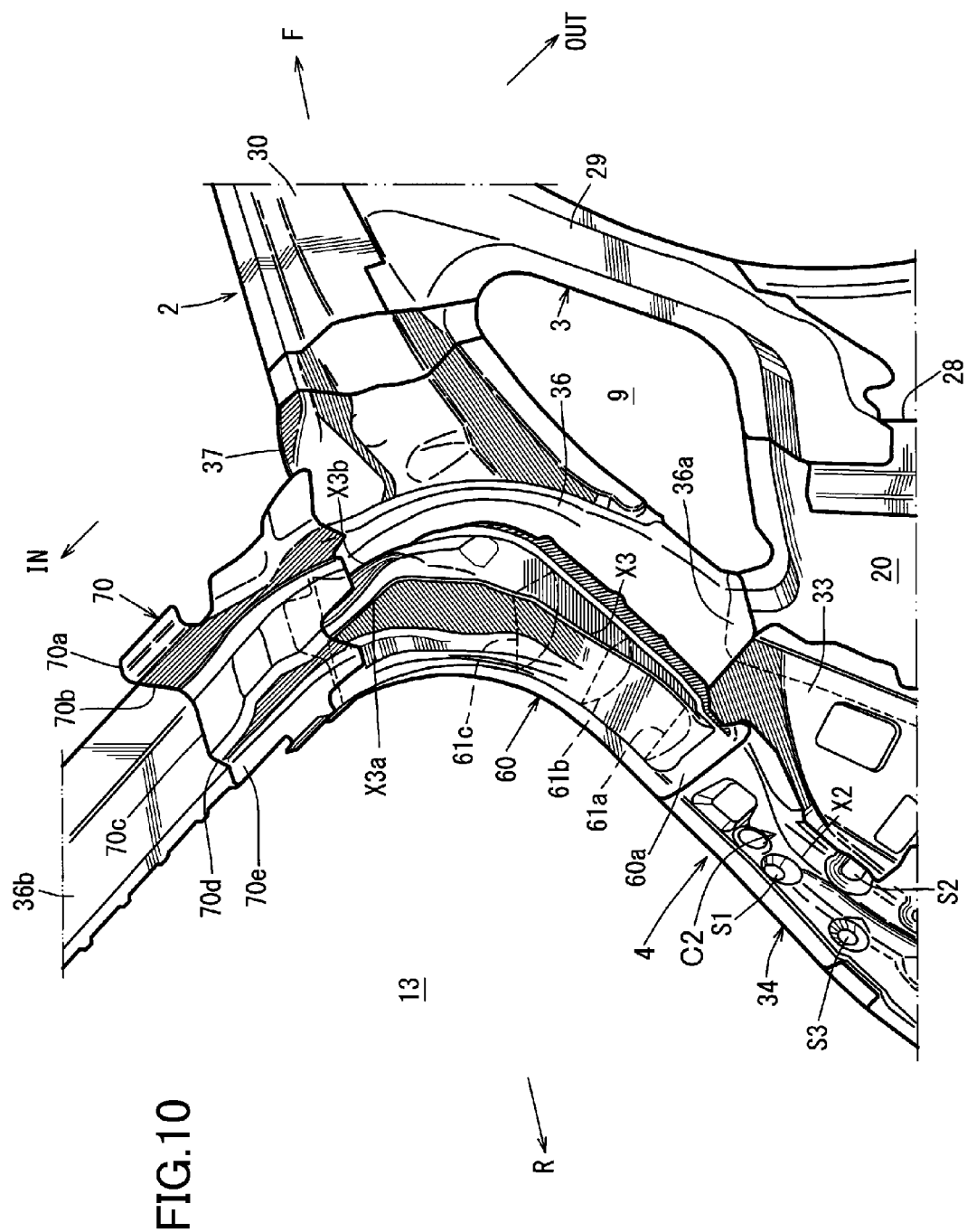
FIG. 10 is a perspective view of a corner reinforcement and the periphery thereof.
Figure 11:
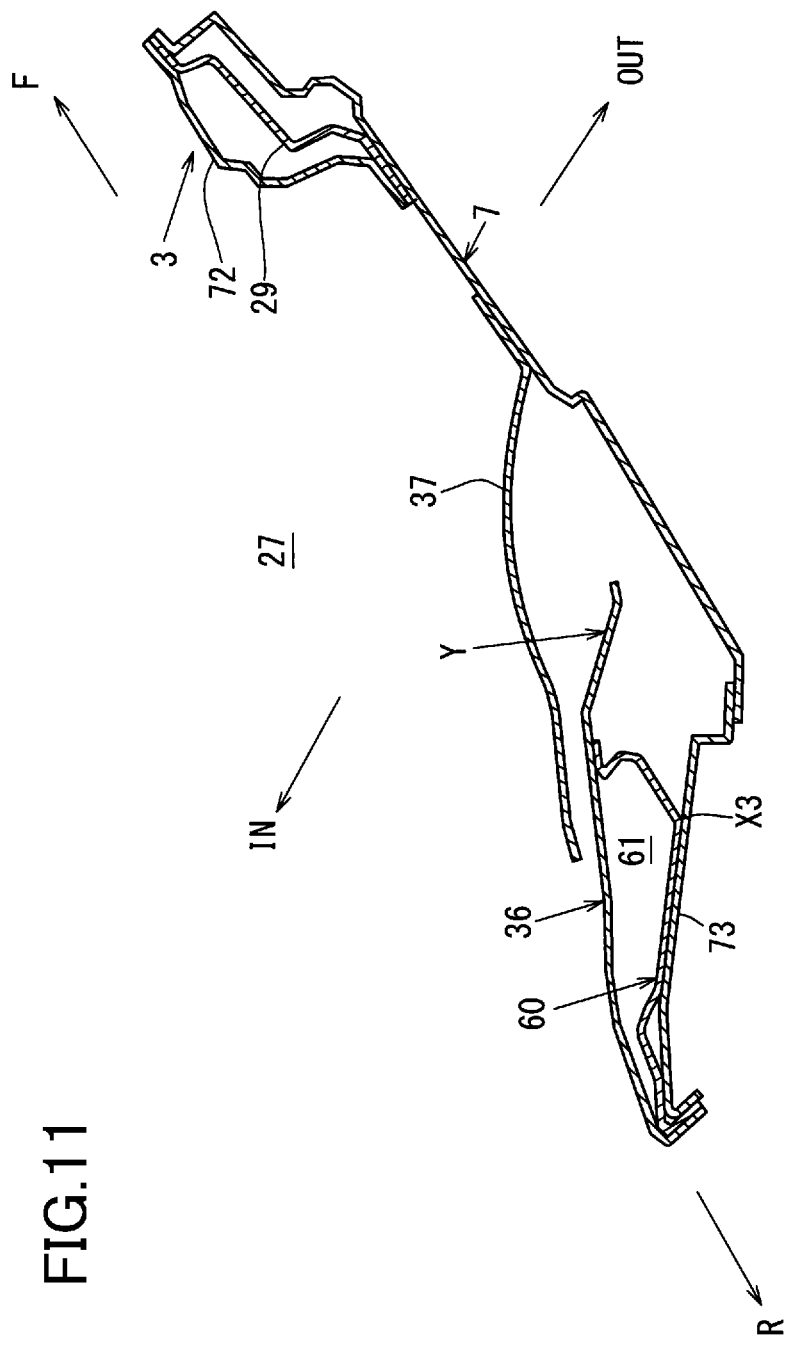
FIG. 11 is a cross-sectional view along an XI-XI line of FIG. 1.
Figure 12:
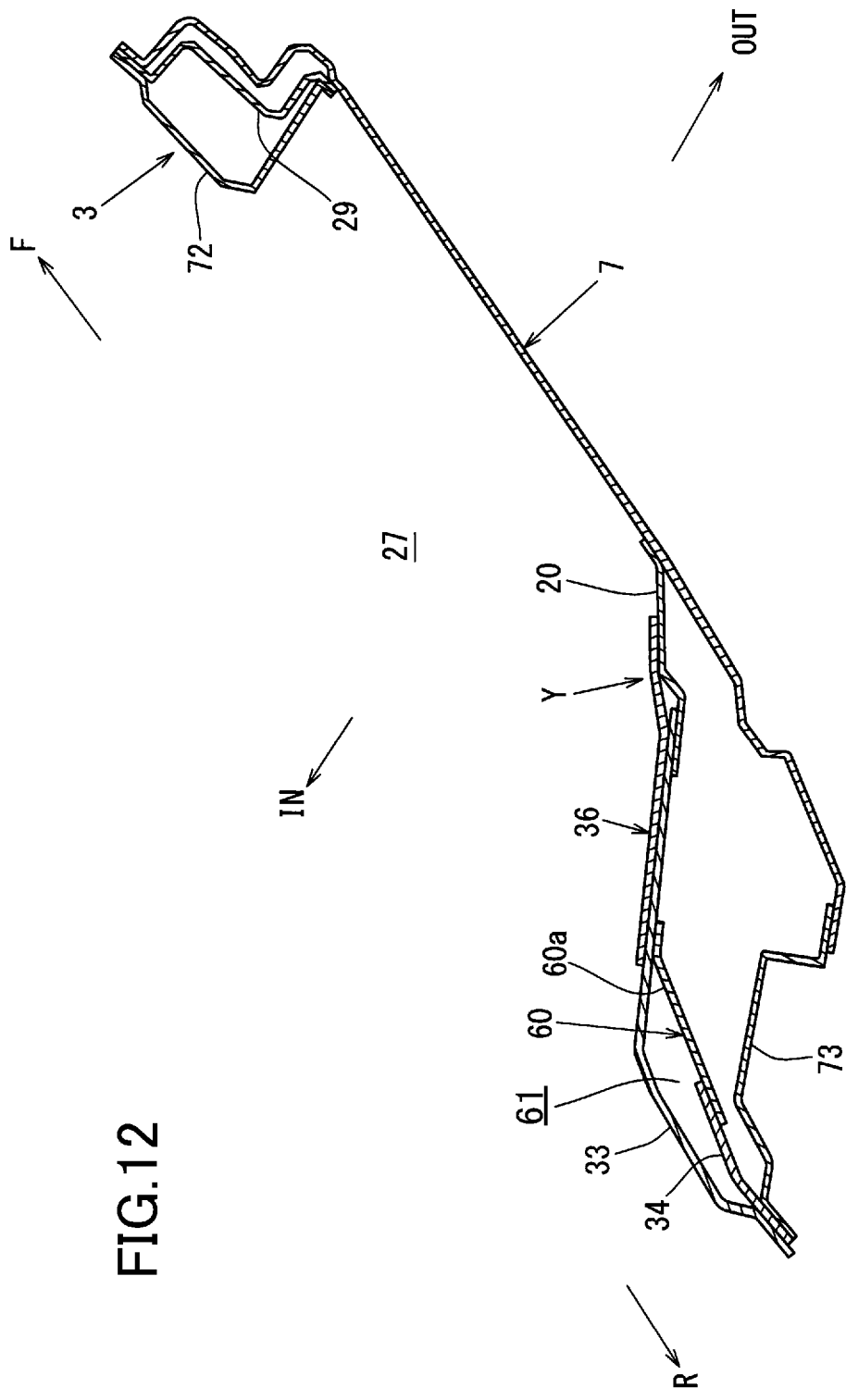
FIG. 12 is a cross-sectional view along an XII-XII line of FIG. 1.

FIG. 9 is a cross-sectional view along an IX-IX line of FIG. 2, FIG. 10 is a perspective view of the corner reinforcement and the periphery thereof, FIG. 11 is a cross-sectional view along an XI-XI line of FIG. 1, and FIG. 12 is a cross-sectional view along an XII-XII line of FIG. 1.

As illustrated in FIGS. 6 and 7, at the connection portion between the rear pillar 4 and the reinforcement 50, the rear pillar inner panel 33 and the rear pillar reinforcement 34 form the L-shaped closed cross section 40. As illustrated in FIGS. 8 and 10, a lower portion 60a of the corner reinforcement 60 is connected to an upper portion of the rear pillar reinforcement 34 to form the closed corner cross section 61 continuously from the L-shaped closed cross section 40 (see FIGS. 11 and 12).

As illustrated in FIG. 10, the corner ridge portion X3 of the corner reinforcement 60 is formed continuously from the ridge portion X2 of the rear pillar reinforcement 34 in the vertical direction. With this configuration, damper load transmission from the ridge portion X2 of the rear pillar reinforcement 34 toward above the closed rear header cross section 19 is improved, and therefore, the stiffness is further ensured.

The closed corner cross section 61 formed by the corner reinforcement 60, the rear pillar inner panel 33, and the upper corner inner panel 36 forming the upper portion of the rear pillar inner panel 33 is formed such that a closed lower cross section 61a, a closed intermediate cross section 61b, and a closed upper cross section 61c gradually become larger from the lower side to the upper side, as indicated by dashed lines in FIG. 10. The closed corner cross section 61 is in such an expanded shape (a substantially lemon shape) that the closed corner cross section 61 is the maximum in the vicinity of the corner portion connected to the roof side rail 2. The corner ridge portion X3 moderately curves along the expanded shape to connect between the ridge portion X2 of the rear pillar 4 and an upper portion of the closed rear header cross section 19.

With this configuration, the modulus of section of an upper corner portion of the trunk opening 13, specifically the modulus of section provided by the corner reinforcement 60, becomes higher than the modulus of section of the L-shaped closed cross section 40, particularly the modulus of section of a corresponding portion of the reinforcement 50. Thus, the bending stiffness of such a corner portion increases. In addition, the stiffness of connection with the roof side rail 2 increases. This realizes stress dispersion, and ensures the stiffness of the corner portion. Moreover, the curvature (the bending moment) of the corner ridge portion X3 is reduced. As a result, a damper load is smoothly transmitted, and the stiffness of the damper support is further improved.

As illustrated in FIGS. 9 and 10, a lower portion 36a of the upper corner inner panel 36 is at the position corresponding to a rear lower one of three corner portions of the quarter window opening 9, and an upper portion 36b of the upper corner inner panel 36 is positioned at an outer end portion of the closed rear header cross section 19 in the vehicle width direction.

The lower portion 60a of the corner reinforcement 60 is at the position which can be joined to an upper end portion of the rear pillar reinforcement 34. As illustrated in FIG. 9, an upper end portion 60b of the corner reinforcement 60 is positioned at the outer end portion of the closed rear header cross section 19 in the vehicle width direction.

A hinge reinforcement 70 attached to a not-shown hinge bracket for the lift gate is provided at the outer end portion of the rear header 10 in the vehicle width direction.

The hinge reinforcement 70 is provided between the roof panel 11 and the rear header 10. The hinge reinforcement 70 is configured such that the following portions are integrated together: a front portion 70a extending in the front-rear direction; a vertical wall portion 70b extending downward from a rear end of the front portion 70a; an extension 70c extending backward from a lower end of the vertical wall portion 70b; a vertical wall portion 70d extending downward from a lower end of the extension 70c; and a rear portion 70e extending backward from a lower end of the vertical wall portion 70d. The hinge reinforcement 70 is formed to have a greater thickness than that of the roof panel 11.

The upper end portion 60b of the corner reinforcement 60 is inserted into a rear portion of the closed rear header cross section 19 formed by the rear header 10 and the hinge reinforcement 70. The upper end portion 60b of the corner reinforcement 60 is formed in an upwardly-raised U-shape (C-shape) such that a lower surface of the extension 70c of the hinge reinforcement 70 is connected to the corner ridge portion X3 of the corner reinforcement 60 and that a closed cross section 71 is formed between the rear header 10 and the upper corner inner panel 36.

With the structures of the closed cross sections 19, 71, deformation of the upper corner portion of the trunk opening 13 is reduced or prevented, and therefore, the stiffness is further increased.

Three portions are welded and fixed together. That is, the extension 11b of the roof panel 11, the extension 70c of the hinge reinforcement 70, and a portion of the corner reinforcement 60 corresponding to the extension 11b and the extension 70c are welded and fixed together. Thus, a welding opening 36c is formed at the upper portion 36b of the upper corner inner panel 36.

Similarly, three portions are welded and fixed together. That is, the recess 11c of the roof panel 11, the rear portion 70e of the hinge reinforcement 70, and a portion of the corner reinforcement 60 corresponding to the recess 11c and the rear portion 70e are welded and fixed together. Thus, a welding opening 36d is formed at the upper portion 36b of the upper corner inner panel 36.

As illustrated in FIGS. 2 and 10, the corner ridge portion X3 of the corner reinforcement 60 is formed to branch into a rear ridge portion X3a and a front ridge portion X3b at an upper portion of the corner ridge portion X3. Each ridge portion X3a, X3b is formed in such a curved shape that the ridge portion X3a, X3b displaces from the vertical direction toward the inside in the vehicle width direction.

As illustrated in FIG. 2, a ridge portion X4 extending continuously from the rear ridge portion X3a in the vehicle width direction is formed at the rear header 10. With this configuration, a damper load is transmitted from the reinforcement 50 to the ridge portion X2 of the rear pillar 4, and then, is transmitted to the ridge portion X4 of the rear header 10 via the corner ridge portion X3 of the corner reinforcement 60. In this manner, the load is dispersed.

As illustrated in FIGS. 11 and 12, the upper corner inner panel 36 includes a vertical wall portion with a flange, i.e., a crank-shaped cross section Y, such that an upper outer edge of the upper corner inner panel 36 in the vehicle width direction and a front portion of the rear header 10 are connected together. With this configuration, the modulus of section of the corner portion is further increased, leading to improvement of the stiffness of the corner portion.

Note that in FIGS. 11 and 12, a reference numeral "72" denotes an intermediate pillar inner panel, and a reference numeral "73" denotes an upper corner outer panel.

Advantageous Effects

As described above, the rear body structure for the automobile according to the above-described example embodiment includes, at the rear body, the right and left damper support brackets 26, the rear pillars 4 each forming the closed cross-sectional shape, and the reinforcements 50 connected in the direction intersecting the rear pillars 4 to transmit a load from the damper support brackets 26 to the rear pillars 4. The trunk 27 is provided between the right and left damper support brackets 26. The trunk opening 13 surrounded by the right and left rear pillars 4, the rear header 10, and the rear end panel 12 is formed. Each rear pillar 4 includes the rear pillar inner panel 33 and the rear pillar reinforcement 34 connected to the rear pillar inner panel 33 from the outside of the vehicle. The rear pillar inner panel 33 and the rear pillar reinforcement 34 each include the substantially L-shaped corner portion C1, C2 raised toward the inner front side in the vehicle width direction and having the front surface 33a, 34a and the side surface 33b, 34b on the inside in the vehicle width direction, and the ridge portion X1, X2 formed by the corner portion C1, C2 and vertically extending along the rear pillar 4. The corner portion C1 of the rear pillar inner panel 33 is disposed on the inner front side in the vehicle width direction with respect to the corner portion C2 of the rear pillar reinforcement 34 such that the L-shaped closed cross section 40 is formed between the corner portions C1, C2. The reinforcement 50 is, not via the closed cross section, directly connected to the corner portion C1 of the rear pillar inner panel 33 and the corner portion C2 of the rear pillar reinforcement 34. The upper portion of the L-shaped closed cross section 40 is connected to the closed rear header cross section 19 having a higher modulus of section than that of the L-shaped closed cross section 40 (see FIGS. 2 and 3 and FIGS. 6 to 8).

According to such a configuration, two components (the rear pillar inner panel 33 and the rear pillar reinforcement 34) including the side surfaces 33b, 34b exhibiting a high stiffness in the front-rear direction and positioned inside in the vehicle width direction and the front surfaces 33a, 34a exhibiting a high stiffness in the vehicle width direction form the L-shaped closed cross section 40, and receive an upward load from the damper. Such a load is upwardly transmitted and dispersed via the ridge portions X1, X2 of the L-shaped corner portions C1, C2.

The above-described modulus of section is less favorable as compared to a rectangular closed cross section having the same front-rear width and right-left width as those of the L-shaped closed cross section. However, deformation of the L-shaped closed cross section 40 can be more reduced as compared to an open cross section, and a load can be dispersed to above the rear pillar 4. Weight reduction and a higher stiffness can be realized without providing an additional reinforcement member(s) (a so-called "backing plate(s)") or increasing the thickness of the rear pillar inner panel 33.

Moreover, the L-shaped closed cross section 40 is formed in the vicinity of the connection portion between the rear pillar 4 and the reinforcement 50. In particular, the reinforcement 50 is directly connected to the rear pillar reinforcement 34, and the upper portion of the L-shaped closed cross section 40 is connected to the closed rear header cross section 19 having a higher modules of section than that of the L-shaped closed cross section 40. Thus, a load can be favorably transmitted and dispersed to above the rear pillar 4. In particular, slight deformation can be effectively reduced when a load is initially input from the damper.

In the above-described example embodiment, the recessed closed cross section is the L-shaped closed cross section 40.

According to such a configuration, manufacturing is more facilitated as compared to, e.g., a more-complicated U-shaped closed cross section. The width of each of the front surfaces 33a, 34a and the side surfaces 33b, 34b can be set wider, and the stiffness in the vehicle width direction and the front-rear direction can be easily increased.

In the above-described example embodiment, both of the rear pillar inner panel 33 and the rear pillar reinforcement 34 are formed respective with the beads 33c, 34c vertically extending along the ridge portions X1, X2 (see FIGS. 6 and 8).

According to such a configuration, the beads 33c, 34c additionally form the ridge portions extending in the vertical direction along the rear pillar 4. Thus, load transmission in the vertical direction can be further improved. Weight reduction and a higher stiffness can be further realized.

In the above-described example embodiment, the protrusion 34d expanding in the front-rear direction is formed at the portion of the bead 34c corresponding to the reinforcement 50 (see FIGS. 6 and 8).

According to such a configuration, the protrusion 34d improves the stiffness of the bead 34c in the front-rear direction, and therefore, bending deformation of the bead 34c in the front-rear direction is reduced. The body stiffness can be improved.

In the above-described example embodiment, the closed rear header cross section 19 extending in the vehicle width direction is formed by the rear header 10 and the rear portion of the roof panel 11 on the upper side of the trunk opening 13. At the portion where the L-shaped closed cross section 40 is formed, the ridge portion X2 of the rear pillar reinforcement 34 protrudes inward of the vehicle, and extends in the vertical direction. The reinforcement 50 is connected to the ridge portion X2 of the rear pillar reinforcement 34.

The closed corner cross section 61 is formed along the rear pillar inner panel 33 such that the corner ridge portion X3 connecting between the ridge portion X2 of the rear pillar reinforcement 34 and the upper surface of the closed rear header cross section 19 is formed (see FIGS. 2, 3, and 7 and FIGS. 8 to 12).

According to such a configuration, the closed corner cross section 61 is formed along the rear pillar inner panel 33, and has the corner ridge portion X3 connecting between the ridge portion X2 of the rear pillar 4 and the upper surface of the closed rear header cross section 19. Thus, the following advantageous effects are provided.

That is, a damper load is directly transmitted from the connection portion between the ridge portion X2 of the rear pillar 4 and the reinforcement 50 to the upper surface of the closed rear header cross section 19 via the corner ridge portion X3. Thus, the load can be dispersed. As a result, deformation of the L-shaped closed cross section 40 at the connection portion between the rear pillar 4 and the reinforcement 50 and deformation of the trunk opening 13, i.e., deformation of the trunk opening 13 to the parallelogram shape, are reduced or prevented. Consequently, the stiffness can be improved.

Moreover, damper load transmission from the ridge portion X2 to the upper surface of the closed rear header cross section 19 via the corner ridge portion X3 is further improved, leading to further stiffness improvement.

In the above-described example embodiment, the corner reinforcement 60 joined to the rear pillar inner panel 33 and forming the closed corner cross section 61 between the corner reinforcement 60 and the rear pillar inner panel 33 is provided. The upper end portion 60b of the corner reinforcement 60 is inserted into the rear portion of the closed rear header cross section 19, the closed rear header cross section 19 being formed by the rear header 10 and the hinge reinforcement 70 formed to have a greater thickness than that of the roof panel 11 and supporting the lift gate. The upper end portion 60b of the corner reinforcement 60 is formed in the upwardly-raised U-shape such that the lower surface of the hinge reinforcement 70 and the corner ridge portion X3 are connected together and that the closed cross section 71 is formed between the rear header 10 and the corner reinforcement 60.

According to such a configuration, a lower surface of the thick hinge reinforcement 70 and the corner ridge portion X3 are connected together. Moreover, the upwardly-raised U-shape of the corner reinforcement 60 forms the closed cross section 71 between the rear header 10 and the corner reinforcement 60. Thus, it can be further ensured that deformation of an upper corner of the trunk opening 13 is reduced or prevented. Consequently, the stiffness can be further improved.

Other Embodiments

The technique disclosed in the present specification is not limited to the configuration of the example embodiment.

For example, in the above-described example embodiment, the cross-sectional portion connected to the upper portion of the L-shaped closed cross section 40 is described as the closed rear header cross section 19. However, a closed cross-sectional portion having a higher modulus of section than that of the L-shaped closed cross section 40 may be employed other than the closed rear header cross section 19.

In the above-described example embodiment, the recessed closed cross section formed by the rear pillar inner panel 33 and the rear pillar reinforcement 34 is described as the L-shaped closed cross section 40. However, a recessed closed cross section having a shape other than the L-shape, such as a U-shape or a C-shape, may be employed.

In the above-described example embodiment, the double structure of the closed cross sections 40, 54 formed respectively on both of the inside and the outside is formed at the connection portion between the rear pillar 4 and the reinforcement 50. However, a single closed cross-sectional structure may be employed.

The joining as described above is not limited to welding, and may be friction stir welding or vacuum bonding. Alternately, a connection member such as a rivet or a bolt, an adhesive, etc. may be used.

In the above-described example embodiment, the rear pillar inner panel 33 and the rear pillar reinforcement 34 is formed respectively with the beads 33c, 34c. However, one of the rear pillar inner panel 33 or the rear pillar reinforcement 34 may be formed with as a bead.

In the above-described example embodiment, the protrusion 34d is formed at the bead 34c. However, the protrusion 34d is not necessarily formed.

In the above-described example embodiment, the frame member is the rear pillar 4. However, the frame member may be the intermediate pillar 3, or may be a cross member or a rear side frame disposed on the vehicle rear side of a not-shown back door, for example.

In the above-described example embodiment, only the configuration on the right side of the vehicle has been described. The configuration on the left side of the vehicle is formed to be symmetrical or substantially symmetrical to the configuration on the right side.

INDUSTRIAL APPLICABILITY

As described above, the technique disclosed in the present specification is useful for a rear body structure for an automobile, the rear body structure including, at a rear body, right and left damper supports, a frame member forming a closed cross-sectional shape, and connection members each connected in the direction intersecting the frame member to transmit a load from a corresponding one of the damper supports to the frame member.

DESCRIPTION OF REFERENCE CHARACTERS (4) Rear Pillar (Frame Member)
(10) Rear Header
(12) Rear End Panel
(13) Trunk Opening
(19) Closed Rear Header Cross Section (Cross-Sectional Portion Having Higher Modulus of Section, Closed Cross-Sectional Portion Extending in Direction Intersecting Frame Member)
(26) Damper Support Bracket (Damper Support)
(27) Trunk
(33) Rear Pillar Inner Panel (Inner Panel of Frame Member)
(34) Rear Pillar Reinforcement (Outer-Vehicle Panel of Frame Member)
(33a), (34a) Front Surface
(33b), (34b) Side Surface
(33c), (34c) Bead
(34d) Protrusion
(36) Upper Corner Inner Panel (Rear Pillar Inner Panel)
(40) L-Shaped Closed Cross Section (Recessed Closed Cross Section)
(50) Reinforcement (Connection Member)
(61), (61a), (61b), (61c) Closed Corner Cross Section
(70) Hinge Reinforcement
(71) Closed Cross Section
(C1), (C2) Corner Portion
(X1), (X2) Ridge Portion
(X3) Corner Ridge Portion

The invention claimed is:

1. A rear body structure for an automobile, comprising: at a rear body,
    right and left damper supports;
    a frame member forming a closed cross-sectional shape; and
    a connection member connected in a direction intersecting the frame member to transmit a load from each damper support to the frame member,
    wherein the frame member includes an inner panel and an outer-vehicle panel connected to the inner panel from an outside of a vehicle,
    the inner panel and the outer-vehicle panel each include a substantially L-shaped corner portion raised toward the inner panel, and a ridge portion formed by the corner portion and extending along the frame member,
    the corner portion of the inner panel and the corner portion of the outer-vehicle panel are arranged in a direction toward the connection member to form a recessed closed cross section between the corner portions,
    the connection member is, not via the closed cross section, directly connected to the corner portion of the inner panel and the corner portion of the outer-vehicle panel, and
    an upper portion of the recessed closed cross section is connected to a cross-sectional portion having a higher modulus of section than that of the recessed closed cross section.

2. The rear body structure of claim 1, wherein the recessed closed cross section is an L-shaped closed cross section.

3. The rear body structure of claim 1, wherein
at least one of the inner panel or the outer-vehicle panel is formed with a bead extending along the ridge portion.

4. The rear body structure of claim 3, wherein
a protrusion is formed at a portion of the bead corresponding to the connection member.

5. The rear body structure of claim 1, wherein
a closed cross-sectional portion extending in the direction intersecting the frame member is formed,
at a portion where the recessed closed cross section is formed, the ridge portion of the outer-vehicle panel protrudes toward a side connected to the connection member,
the connection member is connected to the ridge portion of the outer-vehicle panel,
a closed corner cross section is formed along the inner panel such that a corner ridge portion connecting between the ridge portion of the outer-vehicle panel and an outer-vehicle surface of the closed cross-sectional portion is formed.

6. The rear body structure of claim 5, wherein
a trunk is provided between the right and left damper supports,
the frame member includes right and left rear pillars,
a trunk opening surrounded by the right and left rear pillars, a rear header, and a rear end panel is formed at the rear body,
the connection member is a reinforcement extending from each damper support toward a rear side of the vehicle,
the inner panel is a rear pillar inner panel,
the outer-vehicle panel is a rear pillar reinforcement,
the ridge portion of the rear pillar reinforcement protrudes inward of the vehicle, and extends in a vertical direction,
the closed cross-sectional portion is a closed rear header cross section formed by the rear header and a roof panel rear portion on an upper side of the trunk opening and extending in a vehicle width direction,
the corner ridge portion connects between the ridge portion of the rear pillar reinforcement and an upper surface of the closed rear header cross section, and
the closed corner cross section is formed along the rear pillar inner panel such that the corner ridge portion is formed.

7. The rear body structure of claim 6, wherein
a corner reinforcement joined to the rear pillar inner panel and forming the closed corner cross section between the corner reinforcement and the rear pillar inner panel is provided,
an upper end portion of the corner reinforcement is inserted into a rear portion of a closed cross section, the closed cross section being formed by the rear header and a hinge reinforcement formed to have a greater thickness than that of the roof panel and supporting a lift gate, and
the upper end portion of the corner reinforcement is formed in an upwardly-raised U-shape such that a lower surface of the hinge reinforcement and the corner ridge portion are connected together and that a closed cross section is formed between the rear header and the corner reinforcement.

8. The rear body structure of claim 1, wherein
a trunk is provided between the right and left damper supports,
the frame member includes right and left rear pillars,
a trunk opening surrounded by the right and left rear pillars, a rear header, and a rear end panel is formed at the rear body,
the connection member is a reinforcement extending from each damper support toward a rear side of the vehicle,
the inner panel is a rear pillar inner panel,
the outer-vehicle panel is a rear pillar reinforcement,
each corner portion is raised toward an inner front side in a vehicle width direction, and has a front surface and a side surface on an inside in the vehicle width direction,
each ridge portion extends in a substantially vertical direction along a corresponding one of the rear pillars, and
the corner portion of the rear pillar inner panel is disposed on the inner front side in the vehicle width direction with respect to the corner portion of the rear pillar reinforcement such that the recessed closed cross section is formed between the corner portions.

9. The rear body structure of claim 2, wherein
at least one of the inner panel or the outer-vehicle panel is formed with a bead extending along the ridge portion.

10. The rear body structure of claim 9, wherein
a protrusion is formed at a portion of the bead corresponding to the connection member.

* * * * *